United States Patent [19]

Baitz et al.

[11] Patent Number: 5,364,196
[45] Date of Patent: Nov. 15, 1994

[54] PORTABLE COMPUTER WITH INTEGRAL PRINTER

[75] Inventors: Günter Baitz, Berlin; Joachim Burchart, Schlangen, both of Germany

[73] Assignee: Siemens Nixdorf Informationssysteme Aktiegesellschaft, Paderborn, Germany

[21] Appl. No.: 927,526

[22] PCT Filed: Sep. 21, 1990

[86] PCT No.: PCT/EP90/01610

§ 371 Date: Sep. 15, 1992

§ 102(e) Date: Sep. 15, 1992

[87] PCT Pub. No.: WO91/14221

PCT Pub. Date: Sep. 19, 1991

[30] Foreign Application Priority Data

Mar. 16, 1990 [DE] Germany .............. 4008541

[51] Int. Cl.⁵ ............................. B41J 29/02
[52] U.S. Cl. ................. 400/691; 361/686; 400/88; 400/208; 400/680; 400/633
[58] Field of Search ......... 400/88, 207, 83, 208, 400/208.1, 680, 682, 691, 693, 633; 361/380, 391, 392, 393, 394, 395, 399, 679, 681, 684, 685, 686, 687; 364/708

[56] References Cited

U.S. PATENT DOCUMENTS

| | | | |
|---|---|---|---|
| 4,531,852 | 7/1985 | Madge et al. | 400/605 |
| 4,718,783 | 1/1988 | Tsushimo et al. | 400/208 |
| 4,828,406 | 5/1989 | Mosciatti et al. | 400/88 |
| 4,839,837 | 6/1989 | Chang | 364/708 |
| 4,859,092 | 8/1989 | Makita | 400/83 |
| 4,946,300 | 8/1990 | Makita | 400/680 |
| 4,981,377 | 1/1991 | Hasegawa et al. | 400/605 |
| 5,017,033 | 5/1991 | Herman et al. | 400/693 |
| 5,034,858 | 7/1991 | Kawamoto et al. | 361/394 |
| 5,067,832 | 11/1991 | Baur et al. | 361/394 |
| 5,098,208 | 3/1992 | Martinez | 400/208 |

FOREIGN PATENT DOCUMENTS

| | | | |
|---|---|---|---|
| 2606609 | 5/1988 | France. | |
| 3905852 | 8/1989 | Germany. | |
| 10472 | 2/1981 | Japan | 400/88 |
| 76381 | 4/1985 | Japan | 400/693 |
| 172579 | 9/1985 | Japan | 400/208 |
| 201826 | 12/1987 | Japan | 400/88 |
| 197676 | 8/1988 | Japan | 400/682 |

*Primary Examiner*—David A. Wiecking
*Attorney, Agent, or Firm*—Hill, Steadman & Simpson

[57] ABSTRACT

A laptop computer has a base housing and an associated printer (2'), an input keyboard (320, 328) and a screen (306,304). The base housing has a transport channel (3') for a printing medium which runs towards the rear from the operating side and extends essentially over the whole width of the base housing so that printing media of corresponding width (e.g. A4 format) can be printed. The printer (2) is designed as a flat-bed printer and preferably has a dot matrix printing head which can be moved in the lower housing part (4') transversely to the direction of motion (8) of the printing medium (line direction).

22 Claims, 4 Drawing Sheets

PORTABLE COMPUTER WITH INTEGRAL PRINTER

BACKGROUND OF THE INVENTION

The invention relates to a laptop portable computer (PC) having a base housing with an input keyboard, a screen and a printer arrangement.

With increasing miniaturization, some years ago it proved possible for the first time to manufacture high-performance computers as desktop devices or deskside devices so that they could be used as independent devices at the workstation of a user; such computers were called personal computers (PC). Continued development resulted in a further reduction of the dimensions and weight of personal computers, so that it was possible to accommodate them in portable cases as so-called portables. The latest development are what are called laptops; these are briefcase-format personal computers with a low weight which can be used in areas in which it has hitherto not been possible to utilize computers because they were too large and too heavy.

A severe drawback of previously known laptop computers is the fact that they have no printer, or only a very basic one. In particular, until now it has not been possible to integrate a printer that can print, for example, the current standard commercial A4 format in a laptop computer. With most laptop computers, therefore, it is only possible to connect a conventional printer, which greatly restricts the use of the computer as a mobile device.

A portable computer having a base housing with an input keyboard, a screen and a printer arrangement in which a printer is directly integrated (EPSON HX-20) is also already known. With this known device, the input keyboard, the screen and the printer arrangement are combined in a base housing, the front part of the top side of the device facing the user being occupied by the input keyboard, while a printer, a screen and a microcassette station are arranged next to one another in the rear region of the base housing. In this arrangement only approximately one third of the device width is available for each of the aforementioned components in each case. The printer used in the known laptop computer has therefore a line width of only 24 characters, so that it cannot be used for a large number of computing tasks, in particular for word processing.

SUMMARY OF THE INVENTION

The object of the present invention is to provide a laptop portable computer having a base housing with an input keyboard, a screen and a printer arrangement which essentially has the same performance as conventional personal computers, but which in particular is also capable of printing paper in the conventional A4 format or similar formats, forms and the like.

While in the known solutions, given an essentially predetermined overall size of the device (briefcase format), the printer is assigned the space which remains free after accommodation of the input keyboard, the screen and if appropriate further components, according to the present invention the base housing is first and foremost adapted to the printing tasks, in that one of the principal dimensions of the base housing, preferably its width, is essentially utilized entirely for the width of the transport channel, so that formats corresponding to this width can be printed. As a result of the selected arrangement of the transport channel, a support surface which essentially corresponds to the base area of the base housing is created for the printing medium. Accordingly, the printer arrangement is designed as a flat-bed printer which in conjunction with a suitable printing head is excellently suited to the printing of forms, to the production of copies, etc.

The arrangement according to the invention allows a high-performance printer to be accommodated in the base housing, and its dimensions to be kept compact enough that the input keyboard and/or the screen can be placed on the base housing, as units separate from the base housing, in a non-operating position, without the essentially predetermined overall dimensions of the laptop format being exceeded. This configuration constitutes the transport configuration. For use, the input keyboard and the screen are moved into an operating position.

In accordance with a preferred development of the invention, it is envisaged that the input keyboard be mounted on the base housing so as to be pivotable between a non-operating position resting on the base housing and an operating position arranged on the front operating side thereof in front of the base housing. The dimensions of the input keyboard are selected in such a way that they do not project beyond the outline of the base housing in the non-operating position of the input keyboard; at the same time, the actual keyboard is protected in its non-operating position since the key side rests on the top side of the base housing.

In a similar manner, according to the invention the screen housing with the screen can be pivoted between a non-operating position resting on the base housing and a swung-up operating position. The arrangement is such that when in the non-operating position the actual screen surface is resting on the housing, so that it is effectively protected in its transport configuration; its dimensions are preferably selected so that it does not project beyond the outline of the base housing in its non-operating position.

It is envisaged in another development of the invention that the input keyboard and/or the screen are designed to be detachable from the base housing and can be set up independently of the latter, being detachably connected to the base housing via a connecting cable in each case. It is therefore possible to use the printer arrangement as an independent printer even without the input keyboard and the screen. This purpose is served by a further feature, which will be explained in greater detail further below, according to which the electrical and/or electronic components for the computer part of the device can be inserted into the base housing as a separate board; said board may be omitted if the printer arrangement is used as an independent printer.

It is however also possible to detach only the input keyboard or only the screen from the base unit and to replace them with better units, in particular for use at home or in the office.

The transport channel then preferably has a width that extends essentially over the whole width of the base housing, so that the width dimensions of the base housing are fully utilized to a large extent. According to the invention, the width of the transport channel is at least approximately 21 cm, which corresponds to the width of an upright A4 format.

According to a preferred development of the invention, the printer arrangement is a wire printer with a wire printing head mounted so as to be movable transversely to the direction of motion of the printing medium. Such wire printing heads permit the printing of copies, the printing of multi-part forms, etc.

The base housing is preferably divided in the transport plane of the printing medium so that a lower housing part and an upper housing part that can be placed on, or lifted off from, the lower housing part is produced, the lower housing part accommodating a first group of function components with the printing head which can be moved in the direction of the print lines, lower printing medium transport rollers, and a ribbon system, in each case with their drive apparatus, and there being arranged in the upper housing part on top a second group of function components with a pressure abutment and with upper abutments for the lower transport rollers. In an especially favorable manner this division permits access to individual function components for servicing, or to the paper transport channel in the event of a paper jam. It is of course also possible to accommodate the printing head in the upper housing part and the pressure abutment in the rear part of the housing.

The abutments for the lower transport rollers are preferably designed as upper transport rollers, the lower and upper transport rollers being assigned coupling means in each case which engage with one another when the upper housing part is put in place.

An essential measure for reducing the overall height of the base housing is to provide in the lower housing part an electrical or electronic drive and control module arrangement for the printer, to which essentially all electrical and electronic function components of the printer are plug-connected. This produces a very compact arrangement of said function components and creates a prerequisite for a particularly flat design of the arrangement, as will be described in greater detail further below with reference to an exemplary embodiment. In addition, as a result of the direct plug-in connections of the function components to the drive and control module arrangement, cable connections between the function components on the one hand, and between the latter and the drive and control module arrangement on the other hand are dispensed with, so that the assembly and any servicing work are also considerably facilitated.

As a further essential measure for obtaining a flat design, it is envisaged that it be possible to place the ribbon cassette flat on the top side of the lower housing part, in such a way that its flat top side is flush with the base area of the transport channel; with this arrangement the ribbon cassette also fits into a flat base housing in an ideal manner. Moreover, the ribbon cassette also performs an additional task, in that it serves as a bed or platen for the printing medium, so that a separate bed is not required, which can be utilized to reduce the overall height.

According to a development of the invention, the top side of the lower housing part is formed by a cover plate lying essentially in the plane of the printing medium and having a recessed region for accommodating the ribbon cassette; the cover plate is provided with apertures for the printing head, for lower transport rollers situated in front of or behind the printing head in the insertion direction of the printing medium, for the coupling means assigned to the transport rollers, and for at least one drive journal for the ribbon cassette. In this arrangement, according to the invention the aperture for the printing head, which is formed by a slit extending at least over the width of the print line, is arranged in a part of the recessed region to the rear in the insertion direction of the printing medium and not covered by the inserted ribbon cassette. The apertures for the transport rollers situated in front of the printing head are arranged according to the invention in a region of the recess covered by the inserted ribbon cassette, the ribbon cassette itself then also being provided with apertures for the passage of said transport rollers.

In a further development of the invention it is envisaged that the ribbon cassette is equipped with lateral guide bars with respect to the insertion direction of the printing medium for the lateral guidance of the printing medium, said lateral guide bars being flush in each case with corresponding lateral bars arranged on the non-recessed region of the cover plate.

According to one development of the invention, the upper housing part is connected to the lower housing part in such a way that it can be pivoted about an axis of rotation transverse to the insertion direction of the printing medium and parallel to the plane of the printing medium; spring means are provided, by means of which the upper housing part is pretensioned in its position resting on the lower housing part. As a result of the spring means, the upper abutments for the lower transport rollers are pressed against the lower transport rollers, or against a printing medium, with a given, predetermined force, different thicknesses of the printing medium being automatically taken into account by the resulting different settings of the upper housing part.

As already described further above, the drive and control module arrangement for the printer is designed as a flat circuit board arranged above the bottom of the lower housing part. It preferably occupies only a part of the base housing, so that the base housing also has space for the electrical and/or electronic components of the computer part. It is envisaged according to the invention that a board with the electrical and/or electronic components of the computer part can be inserted into the lower housing part, which board can be connected on the one hard to the drive and control module arrangement of the printer and on the other hand to the input keyboard, the screen, and if appropriate also to associated peripheral devices. The board can preferably be inserted into a board opening arranged in the rear side of the base housing. According to a preferred development of the invention, the board comprises an essentially L-shaped rack in longitudinal section with a bottom wall and a backplane closing off the board opening, it being possible to slide the bottom wall into guide rails formed on the side walls of the base housing. The board carries one or more circuit boards essentially parallel to the bottom wall which can be plugged into the inside of the backplane equipped with output connectors, there being arranged in each case on the board edge remote from the backplane edge contacts which can be coupled with plug connectors arranged in the base housing when the board is pushed in, said plug connectors in turn providing a connection to the drive and control module arrangement of the printer, to the input keyboard and to the screen.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, and in which:

DESCRIPTION OF THE PREFERRED EMBODIMENT

Figure 1:
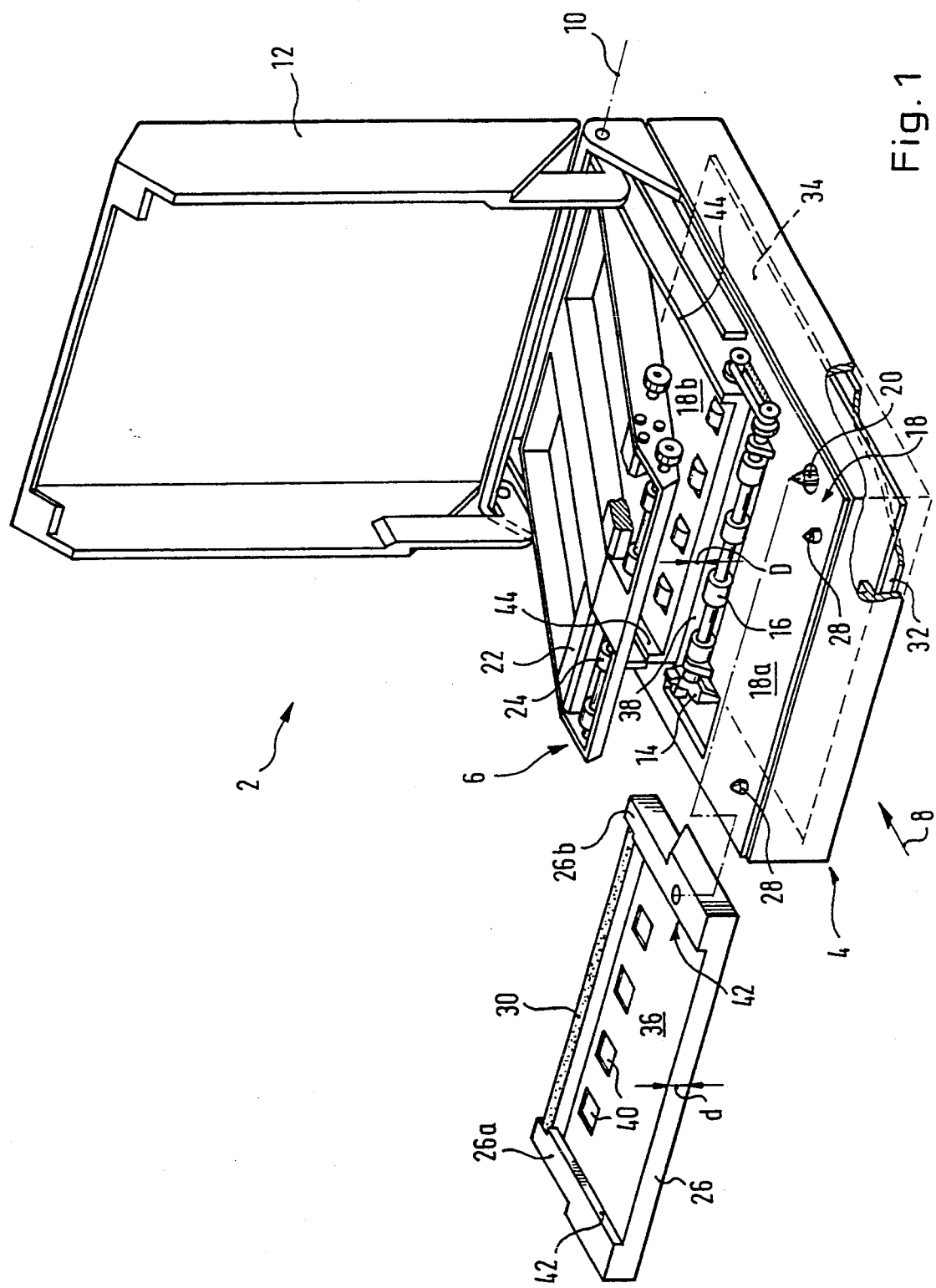
FIG. 1 shows a perspective, partially cutaway view of a base housing with the printer arrangement when the upper housing part is raised and the housing lid is open.

To facilitate comprehension, first of all the base housing 4 with the printer 2 arranged therein is shown in FIG. 1 without input keyboard and screen; the arrangement illustrated in FIG. 1 can also be used as an independent printer. The housing lid 12 then has a simple hood-like form and does not have the depression provided in the housing lid 12' of FIG. 2 for accommodating the screen 312.

The base housing illustrated in FIG. 1 and accommodating the printer 2 essentially comprises a lower housing part 4 and an upper housing part 6 which can be placed on, or lifted off from, the latter. The plane of separation between the lower housing part 4 and the upper housing part 6 essentially coincides with the plane of the printing medium, that is to say with the plane in which a printing medium is transported through the base housing. The upper housing part 6 is mounted on the lower housing part 4 so as to be pivotable about an axis of rotation 10 transverse to the insertion direction 8 of a printing medium and parallel to the plane of the printing medium. The transport channel 3 is formed between lower housing part 4 and upper housing part 6.

A lid 12, likewise arranged on the lower housing part 4 so as to be pivotable about the axis of rotation 10, serves to cover and to close off the printer arrangement when the upper housing part 6 is resting on the lower housing part 4.

The lower housing part 4 accommodates the drive and control electronics and also the concomitant active function components of the printer, such as the printing head 14 which can be moved in line direction transversely to the insertion direction 8, lower transport rollers 16 for transporting the printing medium and also drive means for the ribbon transport, of which only a drive journal 20 protruding through the cover plate 18 is illustrated in FIG. 1.

In the basic version of the printer illustrated in FIG. 1, the upper housing part 6 essentially accommodates only inactive components, namely the pressure abutments 22 extending over the entire length of the print line and also upper transport rollers 24 which have a driving connection with the lower transport rollers 16 via coupling means that will be described later.

As can be seen from FIG. 1, the cover plate 18 has a recessed region 18a at the front in the insertion direction 8, and a region 18b at the rear lying higher than that at the front. The ribbon cassette 26 is laid flat on the recess or on the recessed region 18a of the cover plate 18, two centering pins 28 projecting out from the cover plate 18 engaging in two centering holes (not shown) of the ribbon cassette 26 in order to align and hold the latter in the correct position. The drive journal 20 connected to a ribbon drive is connected to transport rollers arranged inside the ribbon cassette 26 which effect the ribbon transport in a known manner, which is therefore not explained in greater detail. The ribbon cassette 26 has in a likewise known manner two arms 26a and 26b projecting forwards, between which the ribbon 30 is tensioned freely outside the ribbon cassette 26. When the ribbon cassette 26 is placed on the cover plate 18, the ribbon 30, which is turned into the printing plane via suitable deflection means, runs along the track of the printing head 14, so that a printing medium situated between the ribbon 30 and the pressure abutment 22 can be printed.

The bottom 32, which covers at least the front part of the lower housing part 4 from the bottom, is detachable. The circuit board 34 accommodating the drive and control electronics arranged above the bottom 32 is thus readily accessible from below. The thickness d of the ribbon cassette corresponds to the dimension D by which the region 18a of the cover plate 18 is recessed in relation to the region 18b. When the ribbon cassette 26 is placed on the cover plate 18, its top side 36 is accordingly flush with the region 18b of the cover plate 18 and serves as a bed surface for a printing medium to be drawn into the printer.

An aperture 38 through which the tip of the printing head 14 protrudes is provided in the region of the transition from the recessed region 18a to the elevated region 18b of the cover plate 18. The aperture 38 has the form of a slit extending at least over the length of the print line. The dimensions of the ribbon cassette 26 are such that they do not cover the region of the aperture through which the tip of the printing head 14 protrudes, so that the printing head has access to the printing medium transported over and beyond the aperture 38. Separate apertures may be provided for the lower transport rollers 16 situated in front of the printing region. As can be seen from FIG. 1, however, in the present exemplary embodiment the aperture 18 is so large that said lower transport rollers 16 also protrude upwards through the aperture 38. Since the rear part of the ribbon cassette 26 in the insertion direction 8 covers the region of the aperture 38 through which the lower transport rollers protrude, passage openings 40 are formed in the ribbon cassette 26, through which openings the lower transport rollers 16 still pass slightly so that for transporting they can engage with a printing medium lying on the top side 36 of the ribbon cassette 26.

The ribbon cassette 26 is provided with lateral guide bars 42 for the lateral guidance of a printing medium lying on the top side 36 which are continued in lateral guides 44 assigned to the elevated region 18b.

As can be seen in FIG. 1, the aperture 38 is extended beyond the length of the print line on its left side in FIG. 1, so that the printing head 14 can proceed into a rest position lying outside the printing medium width defined by the lateral guides 42 and 44. The aperture 38 is widened in the region of the rest position so that the printing head 14 is readily accessible for servicing purposes.

Figure 2:
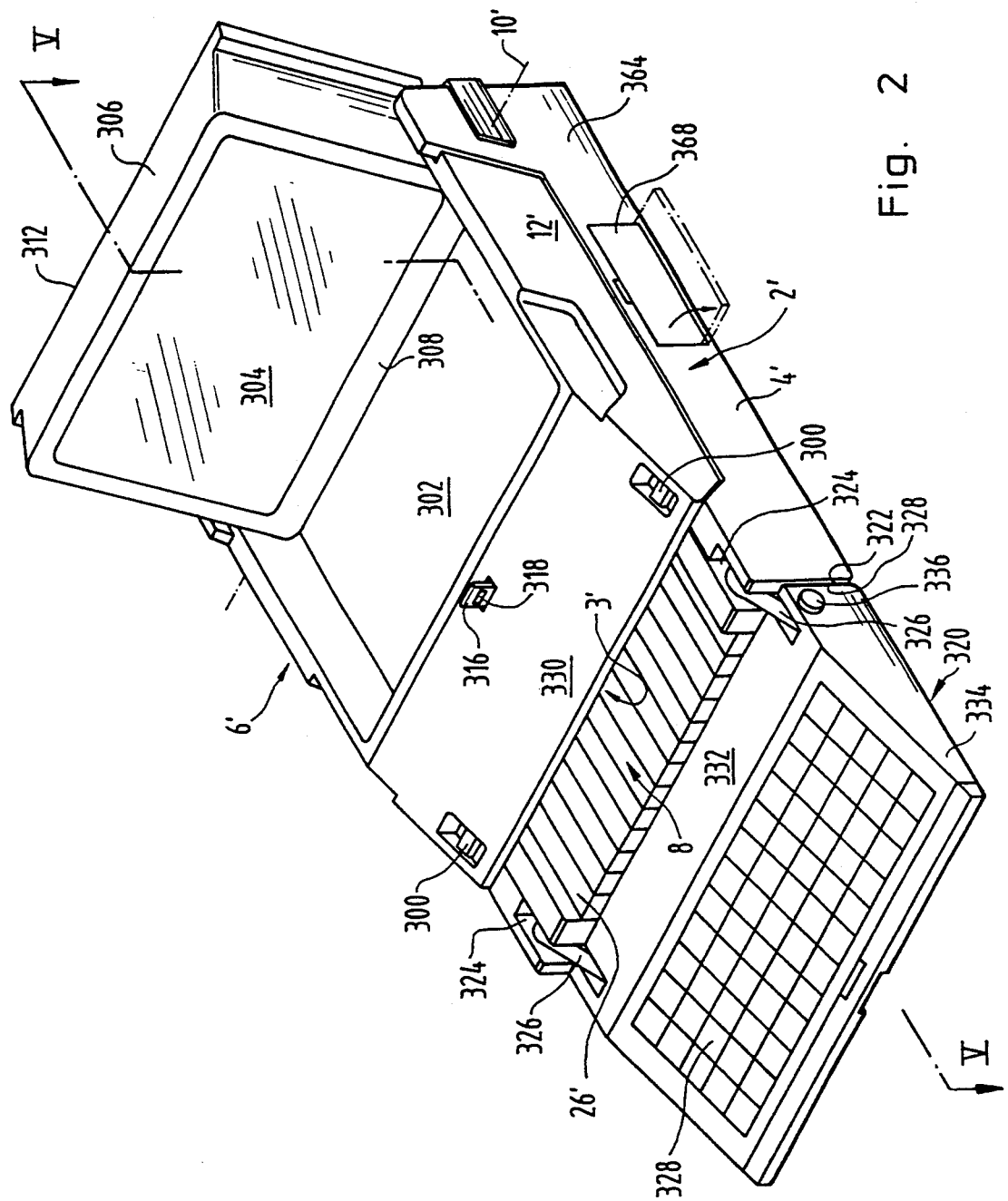
FIG. 2 shows a perspective view of a portable computer using a base housing in accordance with FIG. 1, with input keyboard and screen unit in the operating position.
Figure 3:
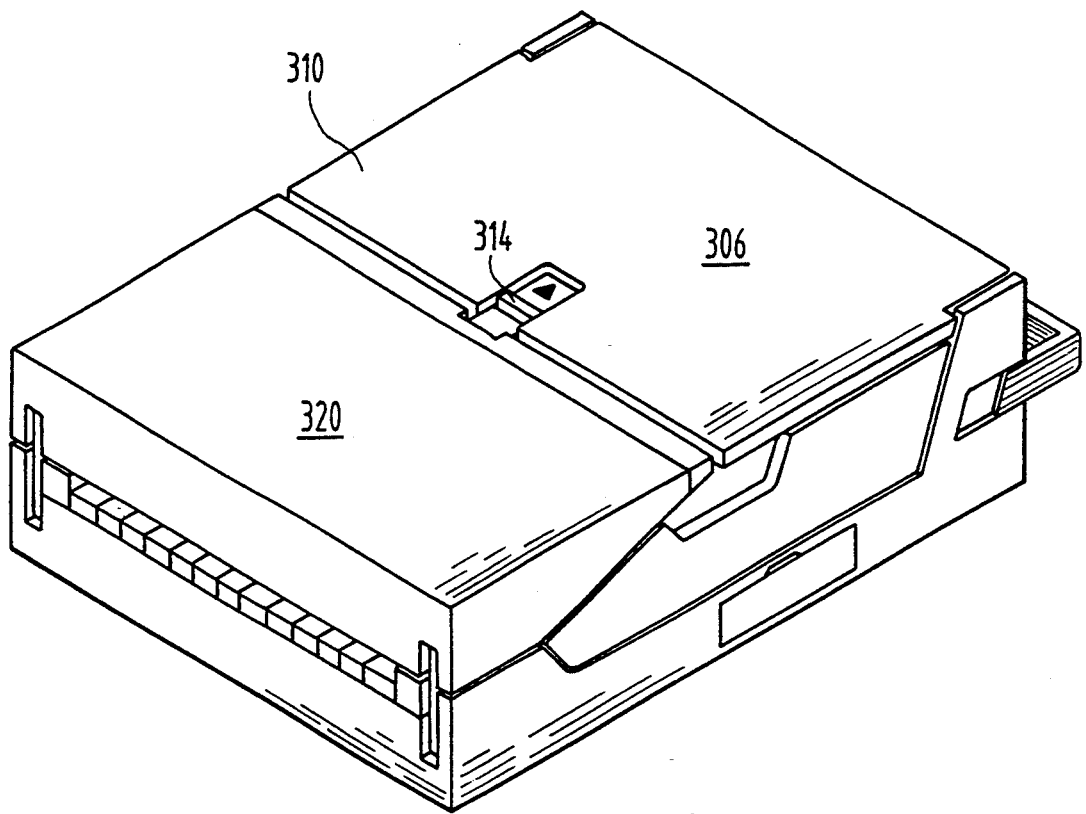
FIG. 3 shows a perspective view of the computer according to FIG. 1 with input keyboard and screen unit in the non-operating position.
Figure 5:
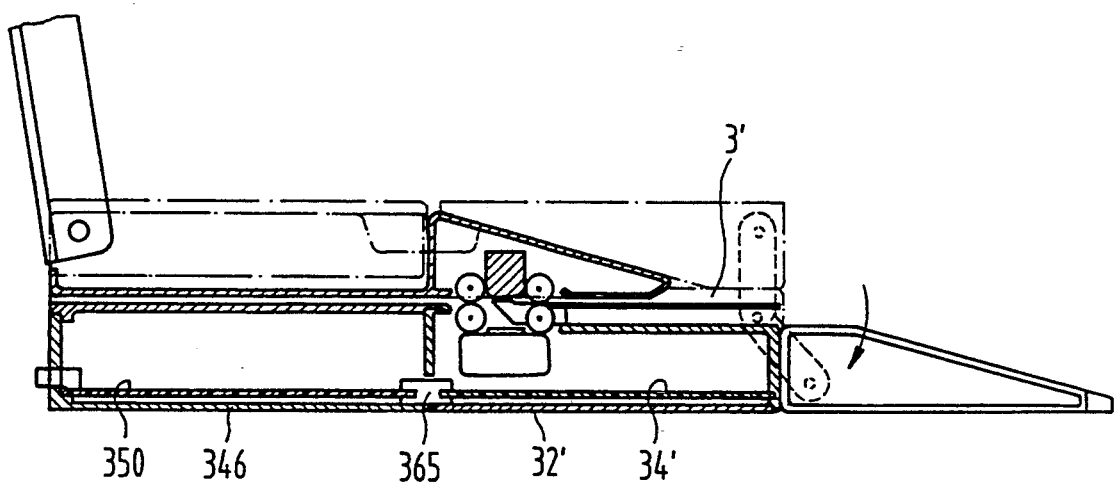
FIG. 5 diagrammatically shows a longitudinal section through a computer according to FIG. 2 along the section line V—V.

FIGS. 2 to 5 in each case show a complete computer according to the invention using a base housing and printer in accordance with FIG. 1; as can be seen from FIG. 2, the housing lid 12' is higher in its rear region than the housing lid 12 in FIG. 1 and is provided with a depression 302 for accommodating the screen housing 306 in its non-operating position (see FIG. 3).

The computer illustrated in FIG. 2 comprises, inter alia, a printer 2' according to FIG. 1 accommodated in a base housing, with a lower housing part 4' and also an upper housing part 6' which can be placed on, or lifted off from, the latter, but which cannot be seen in FIG. 2 because it is covered by a housing lid 12'. The plane of separation between the lower housing part 4' and the upper housing part 6' essentially coincides with the plane of the printing medium, that is to say with the plane in which a printing medium is transported. The upper housing part 6' is mounted on the lower housing part 4' so as to be pivotable about an axis of rotation 10' transverse to the insertion direction 8 of a printing medium and parallel to the plane of the printing medium. The transport channel 3' is formed between the lower housing part 4' and the upper housing part 6'.

The lid 12', likewise arranged on the lower housing part 4' so as to be pivotable about the axis of rotation 10', serves to cover and to close off the printer 2' when the upper housing part 6' is resting on the lower housing part 4'. The lid 12' can be locked with the lower housing part 4' by means of latches 300. The interior structure of the printer has been described with reference to FIG. 1 and does not therefore require explanation again.

A tray-shaped recess 302 which serves to accommodate a housing 306 containing a flat screen 304 in the transport position of the PC (FIG. 3) is situated in the top side of the lid 12'. The screen housing 306 is likewise mounted in the region of its bottom edge 308 so as to be pivotable about the axis of rotation 10'. In the non-operating position, the screen housing 306 can be locked with the lid 12' by means of a further latch 314 arranged on the rear wall 310 thereof in the vicinity of the front edge of the housing 312. In its locking position, the latch 314 engages with a latch catch 316 through an opening 318. Said catch also holds the input keyboard housing 320 in its non-operating position (FIG. 3).

The input keyboard housing 320 has the form of a lectern falling away towards the user. It is pivotably connected to its rear wall 322 via levers 325 engaging to the right and left of the ribbon cassette 26' into cut-outs 324 in the lower housing part 4'. The pivoting region is such that the keyboard housing 320 is in the operating position (FIG. 2) in front of the lower housing part 4', its rear wall 322 lying, for example, directly in front of the front wall 328 and parallel thereto. In the non-operating position, on the other hand, the keyboard housing 320 rests on the printer 2', to be precise in such a way that the key surface 328 is facing the lectern-shaped front part 330 of the lid 12', while the top side 332 of the keyboard housing 320 covers the ribbon cassette 26' (FIG. 3).

The keyboard housing 320 can be released from the levers 326 by means of pressure on the release buttons 336 arranged in the side walls 334 thereof and thus can be used in any position relative to the PC 1, and can even be removed entirely after disconnection of the connection lines, as has been described.

In the embodiment of the printer 2' preferred for use in the PC, the circuit board 34' carrying the drive and control module arrangement is arranged in the front region of the housing part 4'. The detachable bottom 32' also essentially covers only the region occupied by the circuit board 34'.

The rear side of the lower housing part 4' is open. A board 342, which consists of an L-shaped rack 344, can be inserted from the rear into the opening 340. When the board 342 is pushed into the lower housing part 4' (FIG. 5), the lower L-leg 346 joins up with the bottom 32' so that the bottom side of the lower housing part 4' is fully closed off. The upright second L-leg 348 closes off the rear opening 340.

Arranged parallel to the lower L-leg 346 thereof on the rack 344 is a circuit board 350 which carries the electronic assemblies such as CPU, memory and interface logic required for a PC. At least one further board 352 carrying electronic assemblies for optional functions, such as the connection to a telecommunications device or a computer network, can be plugged into said board 350 via a backplane bus connector (not shown).

Also provided on the rack 344 is a power supply unit 354, batteries 356 for non-mains operation of the PC, a hard disk drive 358 and at least one slide-in module 360 for a plug-in chip card 362 containing information-storing memory. It is also possible to fit a diskette drive instead of at least one chip card slide-in module. A flap 368 is located in a side wall 364 of the lower housing part 4'; access to the chip card 362 or the diskette is possible after said flap has been opened (indicated by dot-dashed lines in FIG. 2).

Figure 4:
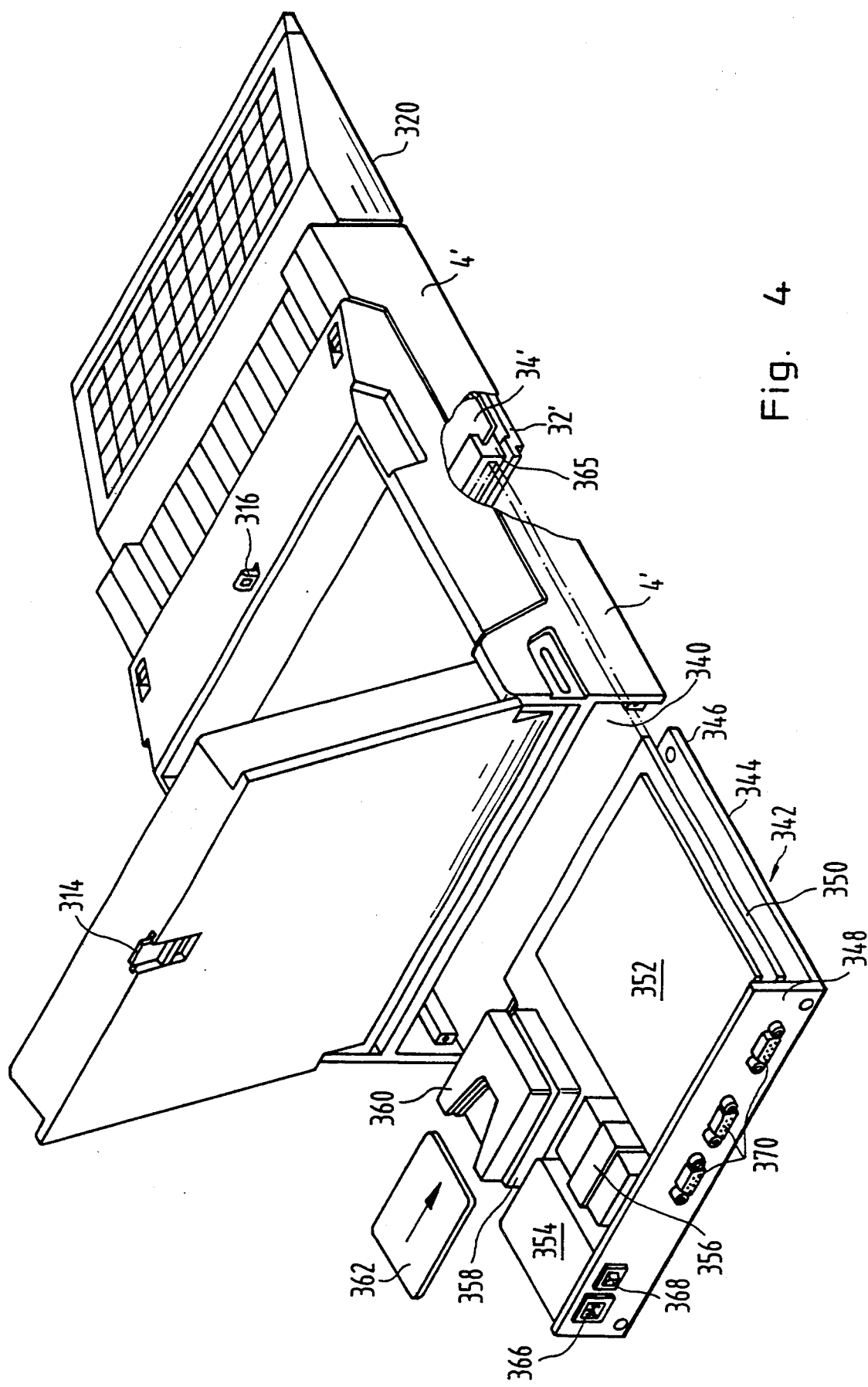
FIG. 4 shows a perspective view of the computer according to FIG. 2 from the rear.

The lower one of the boards 350, 352 is electrically connected to the circuit board 34' via an edge connector coupling 365 (indicated by dot-dashed lines in FIG. 4).

The upright leg 348 of the rack 344 carries a connection socket 366 for a power cable, an on-switch 368 as well as ports 370 for connecting peripheral devices.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed:

1. A portable laptop computer, having a base housing with an input keyboard, a screen and a printer, comprising:

the base housing having a through transport channel which extends essentially parallel to a bottom side of the base housing and has a width corresponding essentially to a length of one edge of the base housing for the passage of a printing medium, a printing head being arranged on one side of a transport plane and a pressure abutment of the printer being arranged on the other side;

the base housing being divided in the transport plane into a lower housing part and an upper housing part that can be placed on, or lifted off from, the lower housing part, the lower housing part accommodating a first group of function components with a printing head which can be moved in the direction of print lines, lower printing medium transport rollers, and a ribbon system, with their respective drive apparatus, and wherein in the upper housing part on top a second group of function components with a pressure abutment and with upper abutments for the lower transport rollers is arranged;

the lower housing part having an electrical or electronic drive and control module arrangement for the printer, to which substantially all electrical and electronic function components of the printer are plug-connected;

a ribbon cassette having a ribbon, said ribbon cassette positioned flat on the top side of the lower housing part, in such a way that a flat top side of the ribbon cassette is flush with a plane of the printing medium, transport rollers arranged in the ribbon cassette being coupled to at least one drive journal protruding through a bed surface for the ribbon cassette; and at least one of the input keyboard and the screen being units which can be adjusted between a non-operating position lying against the base housing and an operating position.

2. The portable computer as claimed in claim 1, wherein the ribbon cassette is equipped with lateral guide bars with respect to an insertion direction of the printing medium for lateral guidance of the printing medium.

3. The portable computer as claimed in claim 1, wherein the input keyboard is pivotably mounted on the base housing between a non-operating position resting on the base housing above the transport channel and an operating position arranged on a front operating side thereof in front of the base housing.

4. The portable computer as claimed in claim 3, wherein the screen is pivotably mounted on the base housing at the rear side of the base housing remote from the front operating side, the screen being pivotable between a non-operating position folded down forwards onto the base housing and a swung-up operating position, in the non-operating positions the screen lying on a back portion of the base housing and the input keyboard lying on a front portion of the base housing, the screen and input keyboard lying side-by-side such that outer surfaces of the screen and input keyboard form a substantially continuous surface.

5. The portable computer as claimed in claim 1, wherein at least one of the input keyboard and the screen are detachable from the base housing and are remotely operable from the base housing, each of them being connectable to the printer via a detachable connecting cable.

6. The portable computer as claimed in claim 1, wherein the transport channel has a width that extends substantially over a whole width of the base housing.

7. The portable computer as claimed in claim 1, wherein the width of the transport channel is at least 21 cm.

8. The portable computer as claimed in claim 1, wherein the printer arrangement is a wire printer, and wherein the printing head is a wire printing head mounted such that the printing head is movable transversely to the direction of motion of the printing medium.

9. The portable computer as claimed in claim 1, wherein the abutments for the lower transport rollers are upper transport rollers, each of the lower and upper transport rollers having coupling means, the coupling means of the upper transport rollers engaging the coupling means of the lower transport rollers when the upper housing part is put in place.

10. The portable computer as claimed in claim 1, wherein the ribbon cassette is equipped with lateral guide bars with respect to an insertion direction of the printing medium for lateral guidance of the printing medium.

11. The portable computer as claimed in claim 1, wherein the upper housing part is connected to the lower housing part such that the upper housing part can be pivoted about an axis of rotation transverse to an insertion direction of the printing medium and parallel to the plane of the printing medium.

12. The portable computer as claimed in claim 11, wherein the upper housing part is pretensioned in its position resting on the lower housing part by spring means.

13. The portable computer as claimed in claim 1, wherein the portable computer further comprises a board with electrical and/or electronic components of a computer part that is insertable into the lower housing part, which board is connectable on the one hand to the drive and control module arrangement of the printer and on the other hand to the input keyboard, the screen, and optionally also to associated peripheral devices.

14. The portable computer as claimed in claim 13, wherein the portable computer further comprises a board opening the rear side of the base housing and wherein the board is insertable into the board opening in the rear side of the base housing.

15. The portable computer as claimed in claim 13, wherein the board has a substantially L-shaped rack in longitudinal section with a bottom wall and a backplane closing off the board opening, the bottom wall engaging into guide rails formed on side walls of the base housing.

16. The portable computer as claimed in claim 15, wherein the board carries at least one circuit board substantially parallel to the bottom wall, said at least one circuit board being pluggable into an inside of the backplane equipped with output connectors, and there being respectively arranged on a board edge of the board remote from the backplane edge contacts which are coupled with plug connectors arranged in the base housing and/or on a circuit board means in the base housing when the board is pushed in.

17. The portable computer as claimed in claim 13, wherein the board has an interface connector for plugging in a mass storage card.

18. The portable computer as claimed in claim 17, wherein a closable opening is formed in a side wall of the base housing for insertion and removal of the mass storage card.

19. A portable laptop computer, having a base housing with an input keyboard, a screen and a printer, comprising:

the base housing having a through transport channel which extends essentially parallel to a bottom side of the base housing and has a width corresponding essentially to a length of one edge of the base housing for the passage of a printing medium, a printing head being arranged on one side of a transport plane and a pressure abutment of the printer being arranged on the other side;

the base housing being divided in the transport plane into a lower housing part and an upper housing part that can be placed on, or lifted off from, the lower housing part, the lower housing part accommodating a first group of function components with a printing head which can be moved in the direction of print lines, lower printing medium transport rollers, and a ribbon system, with their respective drive apparatus, and wherein in the upper housing part on top a second group of function components with a pressure abutment and with upper abutments for the lower transport rollers is arranged;

at least one of the input keyboard and the screen being units which can be adjusted between a non-operating position lying against the base housing and an operating position;

a board with electrical and/or electronic components of a computer part insertable into the lower housing part, which board is connectable on the one hand to a drive and control module arrangement of the printer and on the other hand to the input keyboard, the screen, and optionally also to associated peripheral devices; and the board having a substantially L-shaped rack in longitudinal section with a bottom wall and a backplane closing off the board opening, the bottom wall engaging into guide rails formed on the side walls of the base housing.

20. The portable computer as claimed in claim 19, wherein the board carries at least one circuit board substantially parallel to the bottom wall, said at least one circuit board being pluggable into an inside of the backplane equipped with output connectors, and there being respectively arranged on a board edge of the board remote from the backplane edge contacts which are coupled with plug connectors arranged in the base housing and/or on a circuit board means in the base housing when the board is pushed in.

21. The portable computer as claimed in claim 19, wherein the board has an interface connector for plugging in a mass storage card.

22. The portable computer as claimed in claim 21, wherein a closable opening is formed in a side wall of the base housing for insertion and removal of the mass storage card.

* * * * *